United States Patent [19]

Ben-Ur

[11] 4,378,104

[45] Mar. 29, 1983

[54] FLUID-PRESSURE-LOADED SEAL FOR BUTTERFLY VALVES

[75] Inventor: Yoram Ben-Ur, Newton, Mass.

[73] Assignee: Edison International, Inc., Rolling Meadows, Ill.

[21] Appl. No.: 221,847

[22] Filed: Dec. 31, 1980

[51] Int. Cl.³ .............................................. F16K 25/00
[52] U.S. Cl. ..................................... 251/173; 251/306
[58] Field of Search ................................. 251/173, 306

[56] References Cited

U.S. PATENT DOCUMENTS

| | | | |
|---|---|---|---|
| 2,965,354 | 12/1960 | Grove | 251/306 X |
| 3,095,177 | 6/1963 | Muller | 251/173 |
| 3,129,920 | 4/1964 | Stillwagon | 251/306 X |
| 3,583,668 | 6/1971 | Nelimankka | 251/306 X |
| 3,963,213 | 6/1976 | Brattberg | 251/306 |
| 4,130,285 | 12/1978 | Whitaker | 251/173 X |

FOREIGN PATENT DOCUMENTS 1500181 10/1969 Fed. Rep. of Germany ...... 251/173

*Primary Examiner*—Harold W. Weakley
*Attorney, Agent, or Firm*—Ronald J. LaPorte; Jon C. Gealow; Charles W. MacKinnon

[57] ABSTRACT

This disclosure relates to the construction of butterfly valves of the type used for controlling fluid flow and, more particularly, to a seal for use in sealing the periphery of the closure member of such valves. Further, the seal disclosed herein is loaded by the pressure of the fluid being handled, to enhance the tightness of the seal.

11 Claims, 4 Drawing Figures

FLUID-PRESSURE-LOADED SEAL FOR BUTTERFLY VALVES

BACKGROUND OF THE INVENTION

Butterfly valves have many advantages over other types of valves in fluid flow regulation, the most significant of these being low cost of manufacture, quickness of opening and low restriction to fluid flow when fully opened. However, these valves generally have been limited to low pressure applications because of the difficulty of sealing tightly at high pressures.

In some prior art valves, the seals comprise a seat member located in a groove or grooves in the valve body. In high pressure or velocity applications, many of these seats exhibit a tendency to become dislodged from the grooves when the valves are opened, thereby rendering the valves inoperative. To prevent such seal blow-out, some valves employ elaborate groove arrangements and seat configurations, but that approach increases the initial cost of the valve, raise the cost for repair or replacement of seals, and increases the possibility of seat damage and misalignment. In several types of valves, the contact between the disc and seat must be made so tight (to prevent leakage) that closing the valve, especially large size valves, requires a large torque. In some prior art valves, having seals utilizing a groove and an elastomeric seat, the seat can cold flow under the sealing pressures employed, thereby decreasing seal life time.

There are in existence a number of butterfly valve constructions employing so-called "fluid pressure" seals. Typically in such constructions, a resilient seating member is disposed in annular relation to the fluid passage of the valve, to encircle it in such a position as to engage the periphery of a valve disc which is journalled within the passage for movement between open and closed positions. To augment the seal provided by the natural resilience of the seating member against the valve disc when the latter is in the closed position, there is generally provided a pressure space behind the seat and some means of fluid communication between the pressure space and the high pressure side of the valve. When the valve is closed, fluid under pressure is directed to the pressure space to exert an inwardly directed pressure against the seat, urging the latter into firm engagement with the periphery of the disc.

Typical also of such prior art seals are those in which a seat member is retained in a generally annular recess in the valve body and wherein the fluid pressure differential applied across the valve in a closed position forces the seat to deflect into a "corner" formed by a wall of the annular valve body recess and the peripheral sealing surface of the valve disc.

Another approach has been to provide a valve seat ring which is of lesser inside diameter than the sealing surface of the valve closure element and which is partially restrained against radial stretching by a resilient metal hoop, whereby an interference fit is achieved between the seat and disc, resulting in compression of the seat and stretching of the hoop upon closing the disc. Yet another prior art approach has been to provide a seat member retained in a valve body recess and a rigid annular projection on the downstream side of the body recess, which projection functions as a fulcrum to limit flexure under the influence of fluid pressure, to improve sealing effectiveness.

Some of these prior art valves employ a seat ring which has a "V"-shaped groove in its rear surface, in which is located a back-up ring. Both rings are, in turn, located in a "T"-shaped slot in the valve body. Upstream fluid under pressure enters the slot and moves the back-up ring along the groove to thereby force the seat ring forward into tighter engagement with the disc. This type of seal assembly has several inherent disadvantages. For example, the downstream section of the seat ring may deflect under the fluid pressure, resulting in possible back-up ring extrusion and damage. In addition, installation of the back-up ring and seat ring into the slot usually is difficult, requiring special techniques and frequently causing seal misalignment. Furthermore, these seals usually are not bi-directional; that is they seal better when the upstream side of the seal is on a particular side of the valve disc or stem.

OBJECTS AND SUMMARY OF THE INVENTION

The present invention is intended to provide an improved butterfly valve seal while avoiding such limitations.

Therefore, an object of the present invention is to provide an improved valve seal assembly which will seal tightly at high pressures, will not blow out under high system pressures, and which is operable with a relatively low torque.

A further object is to provide a relatively inexpensive, long-wearing, easily replaceable valve seal assembly.

A still further object is to provide a valve seal assembly which effectively prevents fluid flow in either direction in a high pressure system when the valve is closed.

The present invention provides a seal for rotary fluid control valves of the butterfly type wherein a valve-closure disc is mounted for rotation between an open position, in which the disc lies substantially parallel to the axis of the fluid flow channel through the valve, and a closed position, in which the disc lies perpendicularly to that axis. The disc is mounted for rotation on a valve stem which is attached to one side of the disc. The disc cooperates with an annular, flexible seat circumscribing the fluid flow channel, for shutting off fluid flow through the channel when the disc is in the closed position. The internal fluid pressure acting upon the valve is used to enhance the contact pressure between the flexible seat and both the valve body and valve disc, regardless of the direction in which fluid pressure is applied.

The sealing mechanism, in its simplest form, has only two components—an annular seat ring and a groove in the valve body. The seat ring has a pair of legs (or arms) which spread apart from a connecting point and a "stem" section projecting away from that connecting point. The groove is generally T-shaped. The seat ring is inserted into the groove with the legs of the seat disposed in the "cap" of the T and the stem section of the seat ring protruding out of the shank of the groove; the stem section provides sealing contact with the disc-shaped valve closure member and the legs provide sealing contact with the valve body. Fluid under pressure is admitted into one side of the groove and such flush push applies a "lateral" to the leg of the seat member on that side, urging it toward the other side of the groove. This tends to urge the top of that leg and the stem "upwards", pushing the leg and stem into tighter contact against the end wall of the groove and the periphery of the disc, respectively.

The hub of the disc, and thus the stem, is double offset from the valve center line. That is, it is offset from the center plane of the valve as well as from a diametrical position on the disc. As a result, the rotation of the stem cams the disc into or out of the valve seat, as it rotates to or from the closed position.

BRIEF DESCRIPTION OF THE DRAWING

These and other objects, advantages and operational features will become apparent from the description below, which should be read in conjunction with the accompanying drawing in which.

DETAILED DESCRIPTION OF ILLUSTRATIVE EMBODIMENT

Figure 1:
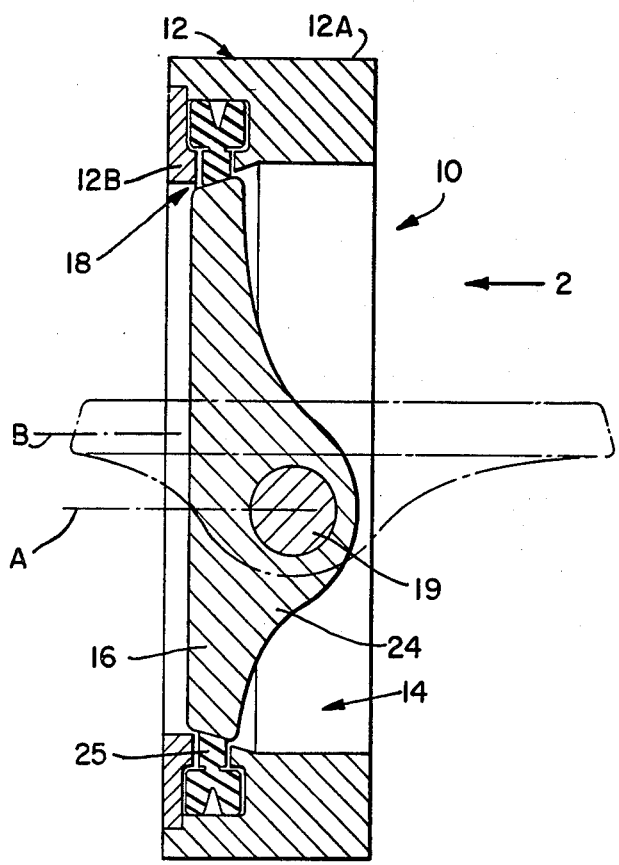
FIG. 1 is a side view of a butterfly valve body and seat according to a first embodiment of the present invention, in cross-section.
Figure 2:
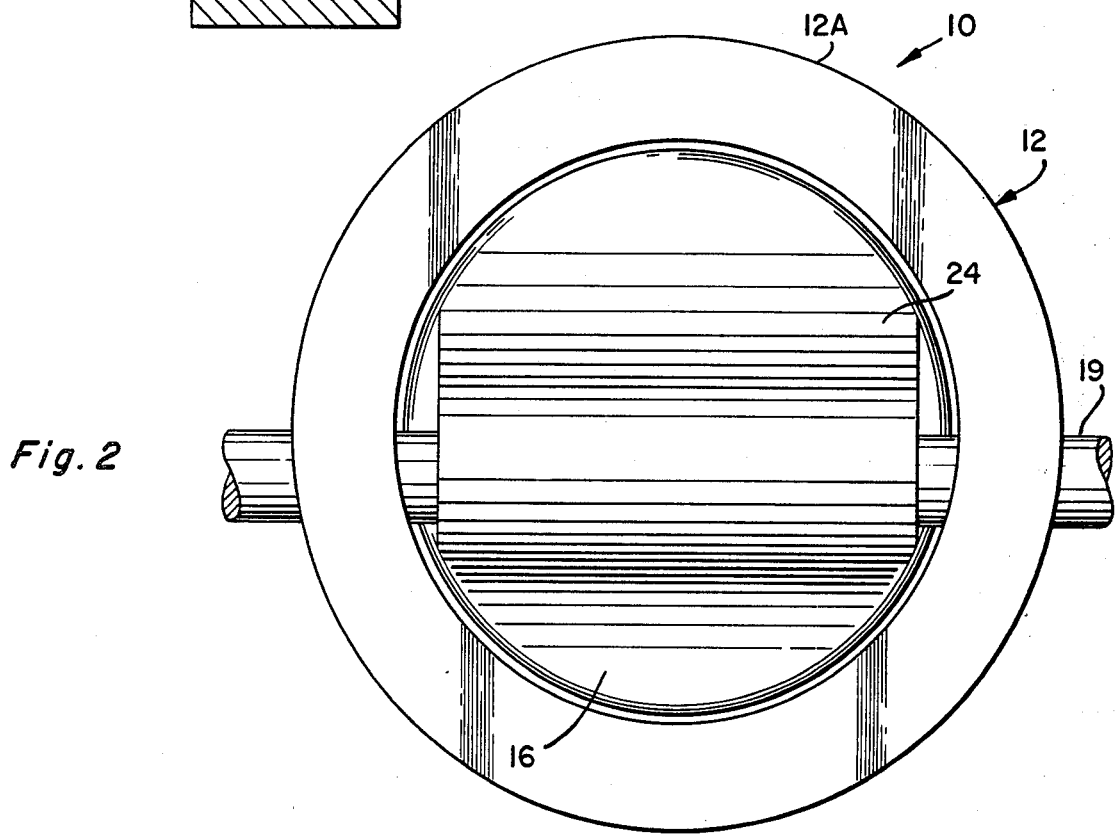
FIG. 2 is a plan view of the valve of FIG. 1 looking in the direction indicated by arrow 2 in FIG. 1.
Figure 3:
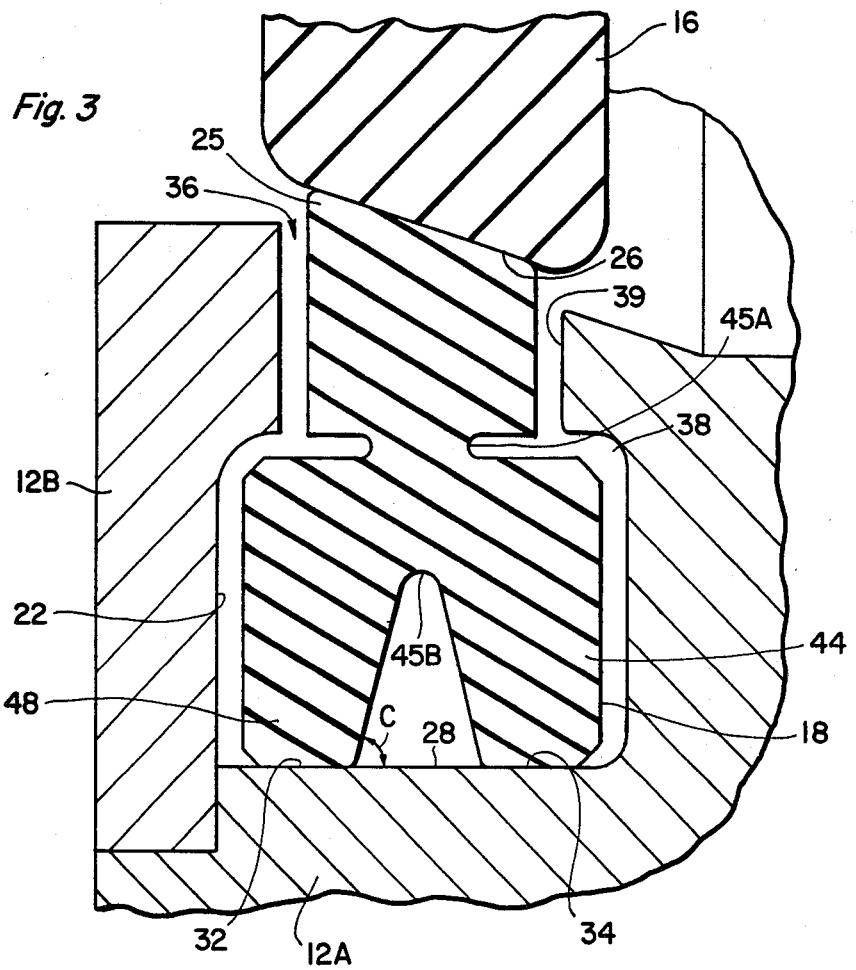
FIG. 3 is an enlarged view of a portion of the seal of the present invention, as illustrated in FIG. 1.

FIGS. 1-3 depict a first illustrative embodiment of the present invention. As seen in FIGS. 1 and 2, a valve, shown generally at 10, includes a cylindrical valve body 12 having a substantially circular, fluid-conducting bore 14 therethrough, a valve closure member 16 and a valve seat shown generally at 18. Valve body 12 is formed in two pieces, 12A and 12B. A valve seat receiving opening, or groove, 22 is formed jointly in valve body pieces 12A and 12B, at their juncture, mostly in body piece 12A. When the two valve body pieces are assembled together, the valve seat member 18 is inserted in and protrudes from groove 22.

Valve closure member 16 is a disc-shaped vane moveable between an open position (shown in phantom line.) and a closed position (indicated in FIGS. 1 and 2). A shaft (or stem) 19 received in hub 24 of disc 16 is the means by which the valve may be opened and closed. The shaft is mounted to one side of the disc, rather than in the plane of the disc, and the center of the shaft, indicated by line A, is displaced (or offset) from the center of the valve, indicated by the line B. As a result, the motion of the disc is not one of simple rotation; rather, it is an eccentric rotation or camming action.

Valve seat member 18 and groove 22 cooperate to provide a highly effective seal. Groove 22 is generally T-shaped, with a nearly rectangular "top" or "cap" section 38 which establishes a cavity and a short shank section 39 which establishes a sleeve. The seat member 18 is received in groove 22 and has a stem portion 25 which protrudes through the shank (or sleeve) section 39 of the groove 22 into the flow passage of the valve, to present a surface 26 for mating with valve closure member 16, to effectuate sealing. Sealing surface 26 and the peripheral sealing surface of the closure member 16 ideally are sections of a sphere. Due to the resiliency of the seat member 18, however, it may be possible to achieve satisfactory sealing if surface 26 is simply conical.

With the reference now to the enlarged view of FIG. 3, it will be seen that when the disc 16 is in the closed position, it engages the seat 18 at surface 26 and compresses the seat against the bottom (or end) walls of groove 22. This effects sealing both at seat face 26, between the disc and the seat, and at bottom wall 28 of groove 22, against the end surface 32 and 34 of the legs of the seat.

The stem portion 25 of the seat is slightly narrower than the shank section 39 of the groove, so that there is a space between the seat stem and the groove shank, forming a passageway 36 between the fluid passage 14 and the groove cavity 38. Fluid enters the groove cavity 38 through passage 36 and applies pressure "laterally" against the upstream leg 44 of seat member 18, urging that leg in the downstream direction (i.e., to the left in FIG. 3) This lateral squeeze tends to deform the seat elastically by urging it to "extend" between the disc's sealing surface and groove end wall 28, thus increasing the surface pressures at seat face 26 and at the contact point 34 between groove wall 28 and the end of leg 44. The action may be analogized to raising the top of an inclined ladder by pushing the ladder sideways toward the wall it is leaning against.

At the point 45A where the seat stem and legs are joined, the thickness of the stem is reduced, to facilitate operation of the portion of the seat between points 45A and 45B as a hinge, permitting legs 44 and/or 48 to pivot relative to stem 25. This pivoting action assists in redirecting the lateral pressure on the seat leg into contact pressure against the disc and the groove.

The thickness reduction of the seat ring at point 45A is created by carving out a nominally "horizontal" slot. Pressurized fluid can enter this slot on the upstream side of the seat ring; the pressurized fluid urges the top and bottom surfaces of the slot apart, further assisting the hinge action.

Figure 4:
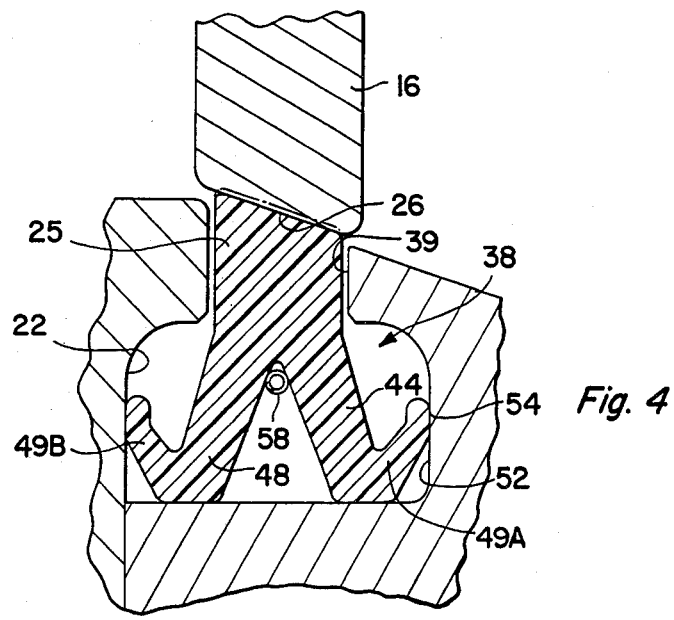
FIG. 4 is a view similar to FIG. 3 and illustrating a second embodiment of the invention.

A second exemplary embodiment of the invention is shown in FIG. 4. In this embodiment, third and fourth legs 49A and 49B have been added to the seat. Fluid pressure admitted to cavity 38 not only pushes laterally on leg 44, but also it urges leg 49A "downward," along side wall 52 of the cavity. This increases the sealing force at contact point 54 between leg 49A and wall 52. The leg 49A also acts as a lever, pushing leg 44 toward the left.

To facilitate movement between the legs of the seat and the walls of the groove, seat 18 should be made of TFE or a material of a similarly low coefficient of friction; depending on the valve application, other materials might be more appropriate than TFE, such as rubber or even metal. Further, the leg or legs of the seat ring member which is (are) to move laterally should preferably make an angle C (see FIG. 3) of between about 55 degrees and 85 degrees with the groove wall 28, to provide appropriate lateral movement of the upstream leg. When made of TFE, the leg(s) of the seat may, for example move from about 3 to about 20 thousandths of an inch, to produce "upward" motion of the stem by about one to one and one-half thousandths of an inch.

It will be be observed that the seat is symmetrical in construction and can be activated from either side of the disc. It relies on fluid pressure to enhance the sealing mechanism and thus reduces the need for high interference between the disc and seat, concomitantly reducing the torque required to seat and unseat the disc. With reference to FIG. 3, if pressure is greater on the left side of disk 16, then fluid pressure admitted to the groove will force leg 48 of the seat to the right, accomplishing the equivalent of moving leg 44 to the left.

The spread legs of the seat automatically retain it in the groove 22, to prevent seal blow-out. The seal is simple in operation and construction. All that is necessary for assembly is to place the seat in the portion of groove 22 in the valve body section 12A and to then bring together body sections 12A and 12B. Therefore, replacement of the seat is a simple operation.

Optionally, a spring 58 may be added, between legs 44 and 48 of the seat (see FIG. 4) to mechanically energize the seal initially, to reinforce the seat ring and to counteract plastic deformation. This may, for example, be a garter spring, as shown, or a leaf spring conforming to the shape of the seat ring, not shown.

Of course, if bi-directional sealing is not needed, the downstream leg(s) 48 (and 49B) of the seat may be omitted.

It will now be apparent that, broadly speaking, the invention involves the use of a resilient seat member disposed between the valve closure member and the valve body. The use of this resilient seat permits the valve closure member to be seated with low torque when the seat member is in a relaxed condition. In a preferred embodiment of the invention the seat has at least two legs depending diverging from a point where they are connected. Upon seating of the closure member, the seating force pushes the divergent ends of the seat ring legs against the valve body, moving them apart slightly. Fluid pressure then builds up against the upstream leg of the seat member, causing it to move laterally and the seat to deform elastically. This increases the contact pressure of the seat member against both the sealing face of the closure member and the valve body.

The specific seal structures disclosed herein are intended to be exemplary only, and not limiting; various modifications, alterations and improvements will, naturally, occur to those skilled in the art. Accordingly, all such readily apparent modifications, alterations and improvements are intended to be and are within the scope of the invention, which is limited only by the following claims.

I claim:

1. In a butterfly valve of the type having a valve body with a cylindrical fluid passage therethrough, and a substantially disc-shaped closure member mounted in the fluid passage for rotation between an open position and a closed position about an axis transverse to the fluid passage, and wherein the closure member further has a peripheral sealing surface, the improvement comprising a seal for tightly sealing the peripheral sealing surface of the closure member, such seal comprising:

in the valve body, an annular groove circumscribing the fluid passage and disposed substantially in alignment with the peripheral sealing surface of the closure member when the closure member is in the closed position;

the annular groove, in cross section, being generally T-shaped, with a substantially rectangular cavity forming the cap of the T and a narrower sleeve portion extending between that cavity and the surface of the fluid passage and forming the shank of the T;

a resilient seat ring member disposed in and projecting from the annular groove into the fluid passage;

the seat ring member, in cross section, having at least a first leg and a second leg such legs being joined together at a first end of each and diverging therefrom, and a stem portion projecting from the first and second legs at their joined ends;

the second ends of the first and second legs of the seat ring member sealingly bearing against the top wall of the cap of the T defining said rectangular cavity;

the stem portion of the seat ring member disposed in and projecting through the sleeve portion of the groove into the fluid passage;

the stem portion of the seat ring member being smaller in cross-sectional width than the sleeve part of the groove, to permit fluid from the upstream side of the passage to enter the rectangular cavity and apply lateral pressure against a corresponding one of said first and second legs of the seat ring member; and said one of said first and second legs of the seat ring member being movable laterally toward the other of such legs responsive to fluid pressure created within the rectangular cavity thereby elastically deforming the seat ring member and urging the stem portion of the seat ring member against the peripheral sealing surface of the disc, the second ends of the first and second seat ring legs remaining in bearing relation against the top wall of the cap of the T defining said rectangular cavity, whereby fluid pressure enhances the contact pressure and, thus, the sealing action, between the seat ring member and the closure member as well as between the seat ring member and the groove.

2. The butterfly valve of claim 1 wherein the seat ring member further includes third and fourth legs, depending from the second ends of the first and second legs, respectively;

the third and fourth legs being adapted to sealingly bear against opposite second and third walls, respectively, of the rectangular cavity joining said top wall.

3. The butterfly valve of claim 2 wherein the first, second, third, and fourth legs of the seat member provide a substantially W-shaped cross-section, with the first and second legs forming the two inner legs of the W and the third and fourth legs forming the two outer legs of the W, said third and fourth legs extending generally in the direction of said stem portion of said seat ring member.

4. The butterfly valve of any of claims 1–3 wherein the sleeve portion of the groove extends between a fourth wall of the cavity and the fluid passage, and the second ends of the first and second legs of the seat ring member project outwardly from the vicinity of such sleeve portion and to a greater extent than the sleeve portion of the groove, to retain the seat ring member in the groove.

5. The butterfly valve of claim 4 wherein the peripheral sealing surface of the valve closure member is a section of a sphere.

6. The butterfly valve of claim 5 wherein the rotational axis of the closure member is offset from a diametrical position on the closure member as well as from the center plane of the valve, whereby the rotation of the closure member involves a camming action.

7. The butterfly valve of claim 6 wherein the stem portion of the seat ring member has a surface adapted to engage the peripheral sealing surface of the closure member and such surface of the seat ring member is oriented substantially parallel to the orientation of the peripheral sealing surface of the closure member when the closure member is in the closed position.

8. The butterfly valve of any of claims 1–3 wherein the seat ring member is formed of a material having a low coefficient of friction, to facilitate the lateral motion of said one of said first and second legs of the seat ring member adapted to move laterally.

9. The butterfly valve of claim 8 wherein each leg of the seat ring member which is adapted to move laterally makes an angle of between approximately 55 and 85 degrees with said top wall of the cap of the T defining said rectangular cavity when the valve is in the open position.

10. The butterfly valve of any of claims 1-3 wherein a portion of the seat ring member comprises an elastic hinge area.

11. The butterfly valve of claim 10 wherein the seat ring member further includes a cut out slot portion adjacent said hinge area, whereby pressurized fluid is admissible to said slot to facilitate movement in the hinge area.

* * * * *